US006596045B2

(12) United States Patent
Qian

(10) Patent No.: US 6,596,045 B2
(45) Date of Patent: Jul. 22, 2003

(54) CYCLONIC DEVICE FOR VACUUM CLEANERS HAVING A DUST OUTLET CHANNEL IN AN END WALL

(75) Inventor: Dongqi Qian, Suzhou (CN)

(73) Assignee: Tek Electrical (Suzhou) Co., Ltd., Jiangsu (CH)

(*) Notice: Subject to any disclaimer, the term of this patent is extended or adjusted under 35 U.S.C. 154(b) by 0 days.

(21) Appl. No.: 10/016,504

(22) Filed: Dec. 10, 2001

(65) Prior Publication Data

US 2003/0106291 A1 Jun. 12, 2003

(51) Int. Cl.[7] ..................... B01D 45/12

(52) U.S. Cl. ..................... 55/337; 55/394; 55/423; 55/429; 55/459.1; 55/DIG. 3

(58) Field of Search ..................... 55/42.9, 459.1, 55/399, 396, 395, 394, 423, DIG. 3, 337

(56) References Cited

U.S. PATENT DOCUMENTS 2,943,698 A * 7/1960 Bishop ..................... 55/337
6,221,134 B1 * 4/2001 Conrad et al. ..................... 95/271

FOREIGN PATENT DOCUMENTS

EP 0 966 912 A1 12/1999
GB 700791 12/1953
WO WO 00/74547 A1 12/2000
WO WO 01/07168 A1 2/2001
WO WO 01/12050 A1 2/2001

* cited by examiner

*Primary Examiner*—Robert A. Hopkins
(74) *Attorney, Agent, or Firm*—Christensen O'Connor Johnson Kindness PLLC

(57) ABSTRACT

The present invention is to provide a device for a vacuum cleaner including a cyclone separator having a cyclone comprising a first end wall; a second end wall opposite to the first end wall; an intermediate part between the first end wall and the second end wall, being shaped as either a cylinder or a partially truncated cone. The cyclone separator further includes an air suction inlet close to the first end wall and substantially tangential to the inner surface of the intermediate part, and a vacuum suction opening far away from the first end wall connected to a vacuum source route. An opening for a dust outlet channel is provided on the second end wall in such a manner that a dust separated from the dust outlet moves in a direction which forms an angle of α less than 90° with an axis R of rotation of a vortex created by the cyclone separator comprising the first end wall and the second end wall, and enters a dust collecting chamber through the dust outlet channel connected to the dust collecting chamber.

7 Claims, 4 Drawing Sheets

CYCLONIC DEVICE FOR VACUUM CLEANERS HAVING A DUST OUTLET CHANNEL IN AN END WALL

FIELD OF THE INVENTION

The present invention relates to a vacuum cleaner, particularly to a cyclone separator device for a vacuum cleaner.

BACKGROUND OF THE INVENTION

EP0966912 discloses a cyclone separator for a vacuum cleaner, which comprises a first end wall, an opposite second end wall and an intermediate part. The intermediate part, which has a shape of either a cylinder or a partially truncated cone, includes a chamber for extracting particles. The particles separated by a cyclone is flowing toward the second end wall through the intermediate part. An air suction inlet tangential to the side wall of the cyclone separator is formed close to the first end wall. An air outlet tube inserted the intermediate part from the first end wall is communicated with a vacuum source. The chamber for extracting particles continues into a separation part having a side wall opening at the end wall, and a port of channel for separated dust is opened at one of side walls of the chamber of the separation part. As a result, when the direction of the particle motion is orthogonal to the rotational axis of the vortex created by the cyclone separator, the particles are extracted into a dust-collecting container outside the separation part. However, in the prior art, the track along which the particles to be separated and flow inside the cyclone separator is generally a spiral. Therefore, it is impossible there should be an orthogonal relation between the track of the particles and the axis of the vortex while particles are being separated. In addition, as the channel for separated dust is orthogonal to the axis of the vortex (as shown in FIG. 7 of this application) in the prior art, the dust particles can't move smoothly for the reason that the channel is not in concord with the track of the dust motion.

SUMMARY OF THE INVENTION

An object of the present invention is to provide a device for a vacuum cleaner that includes a cyclone separator having a cyclone comprising a first end wall, a second end wall opposite to the first end wall, an intermediate part between the first end wall and the second end wall, being shaped as either a cylinder or a partially truncated cone. The cyclone separator further includes an air suction inlet close to the first end wall and substantially tangential to the inner surface of the intermediate part, and a vacuum suction opening far away from the first end wall connected to a vacuum source route.

An opening for a dust outlet channel is provided on the second end wall in such a manner that dust separated from the dust outlet moves in a direction which forms an angle of $\alpha$ less than 90° with an axis R of rotation of a vortex created by the cyclone separator comprising the first end wall and the second end wall, and enters a dust-collecting chamber through the dust outlet channel connected to it.

Compared with the prior art, the present invention has the following advantages.

Firstly, since the channel for extracting separated dust is provided in concord with the track of the dust movement, the dust can be smoothly separated into the dust-collecting chamber along the channel under the action of a centrifugal force. Secondly, the channel for extracting separated dust is located on the second end wall to make sure that the dust can be separated.

DETAILED DESCRIPTION OF THE EMBODIMENTS

Figure 1:
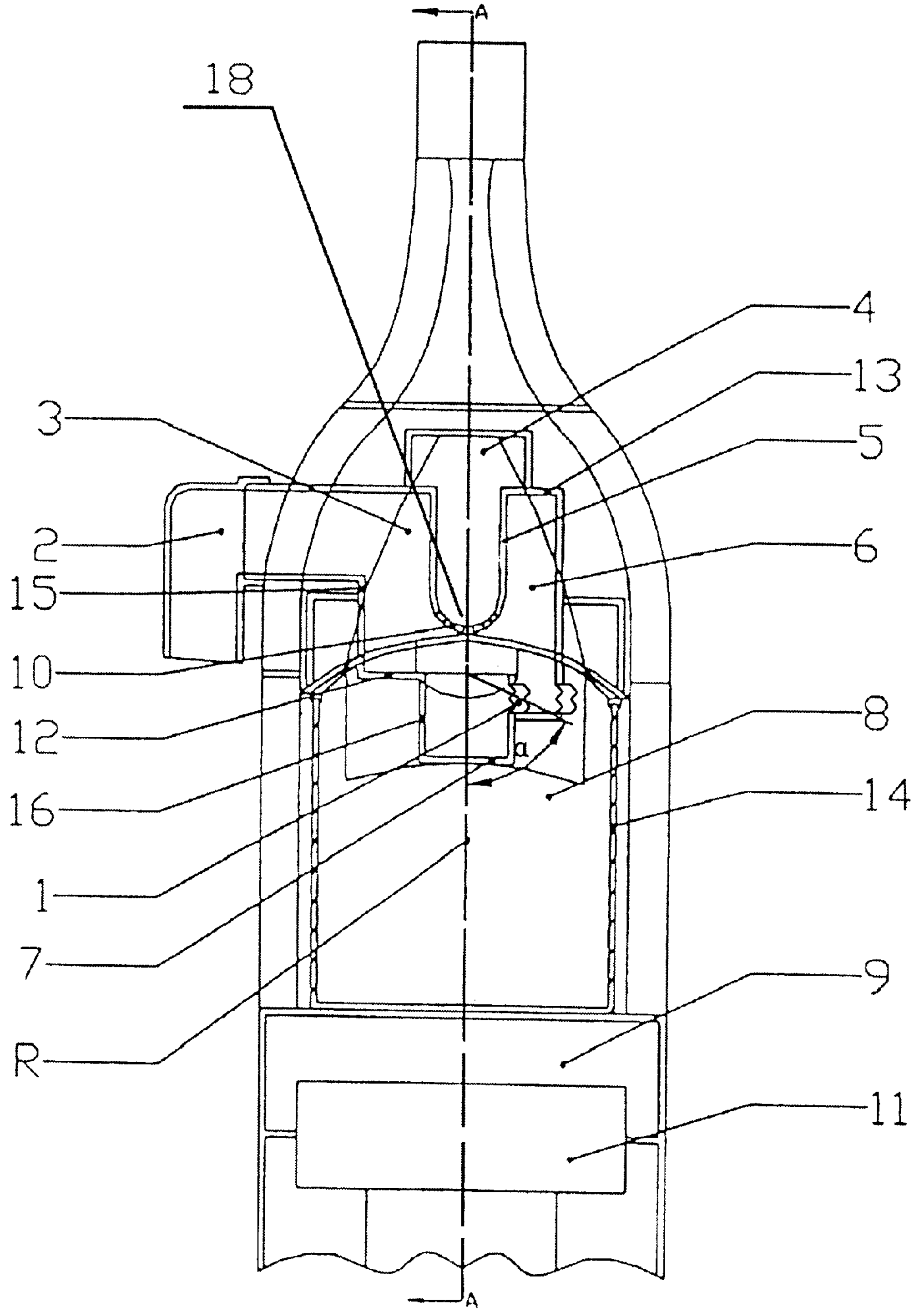
FIG. 1 is an elevation view of the structure of a first embodiment according to the present invention.
Figure 2:
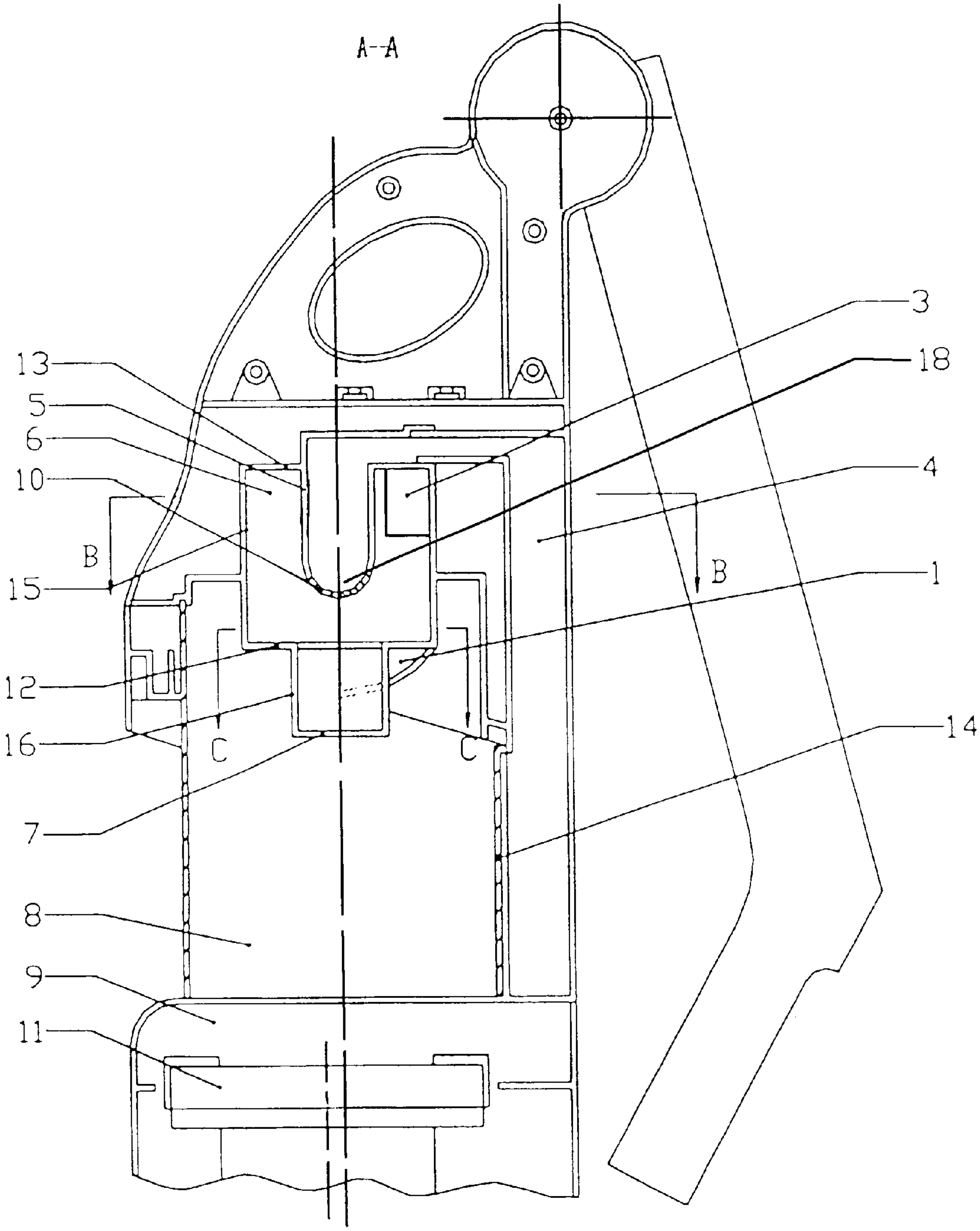
FIG. 2 is a sectional view taken on A—A in FIG. 1.
Figure 3:
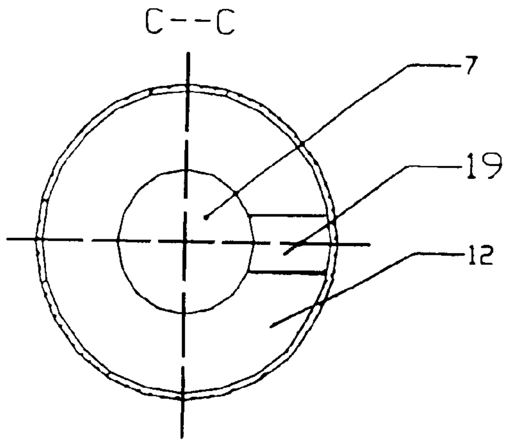
FIG. 3 is a sectional view taken on C—C in FIG. 2.
Figure 4:
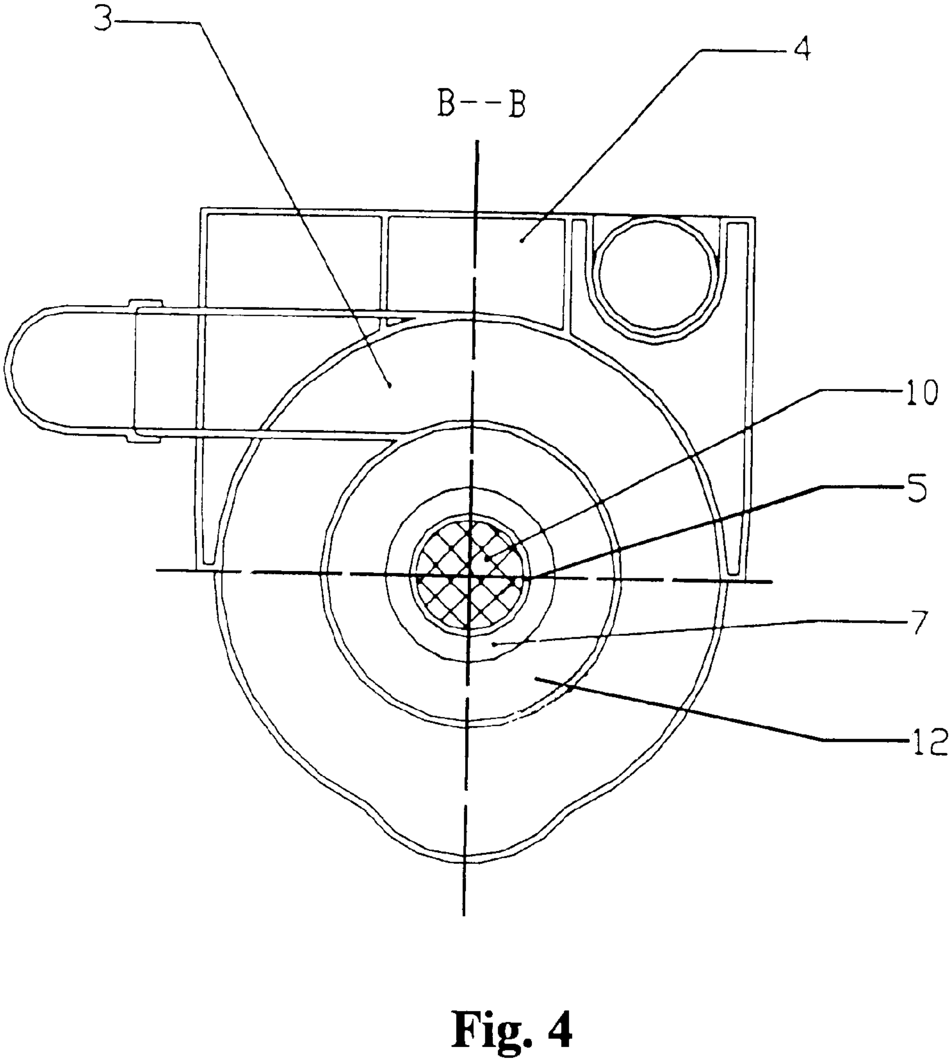
FIG. 4 is a sectional view taken on B—B in FIG. 2.

The invention will be further described in combination with the accompanying drawings.

FIGS. 1 through 4 show a cyclone separator device for a vacuum made according to one embodiment of the invention. The cyclone separator comprises a first end wall 13, a second end wall 12 opposite to the first end wall 13 and an intermediate part 6 between the first end wall 13 and the second end wall 12. The intermediate part 6 may be in the shape of a cylinder or a partially truncated cone. The cyclone separator includes an air suction inlet 3 substantially tangential to the inner surface of the intermediate part 6 and close to the first end wall 13, and a vacuum suction opening 18 far away from the first end wall communicated with a vacuum source route 4. The second end wall 12 comprises an opening 19 of a channel 1 for extracting separated dust. The separated dust then goes in a direction which forms an angle of $\alpha$ less than 90° with an axis R of rotation of a vortex created by the cyclone separator comprising the first end wall 13 and the second end wall 12. In the end, the separated dust enters a dust collecting chamber 8 through the opening 19 of the channel 1 positioned within the dust collecting chamber 8. In general, the angle of $\alpha$ is from 65° to 89°. More preferably, the angle of $\alpha$ is between 75° and 85°.

The channel 1 is generally in the shape of a spiral. Alternatively, the channel 1 may be a straight one as it is relatively short.

Since the axis R created by the cyclone separator may be vertical, the cleaner comprising the same is also called a vertical cleaner. In this case, the channel 1 is arranged on the second end wall 12 and the dust-collecting chamber 8 is located under the cyclone separator. The separated dust falls freely into the dust-collecting chamber 8 after leaving the channel 1.

In another embodiment of the invention, the axis R of the vortex created by the cyclone separator is horizontal (so called as a horizontal type, not shown, just as disclosed in EP0966912). In this case, the dust-collecting chamber 8 is positioned outside of the cyclone separator.

A dust-collecting container 14 positioned in the collecting chamber 8 is connected to the cyclone separator. A sealing ring (not shown) is provided between the cyclone separator and the dust-collecting container 14 and is fixed by a locking mechanism (not shown), which is obvious for those skilled in the art. The dust-collecting container 14 may be separated from the cyclone separator for cleaning when the locking mechanism is unlocked.

In one embodiment of the invention, the plane of the second end wall 12 is perpendicular to the axis R of the air vortex. In another embodiment, the plane of the second end wall 12 may be inclined to the axis R.

In this embodiment shown in FIGS. 1–4, the intermediate part 6 includes a first side wall 15 having a larger inner diameter connected to the first end wall 13 and a second side wall 16 having a smaller inner diameter connected to a third end wall 7. The first side wall 15 and the second side 16 are connected to the second end wall 12, respectively. The first end wall 13 is connected to an air outlet tube 5 extended toward the second end wall 12, which is covered by a filter 10. The vacuum suction opening 18 is positioned at the end of the air outlet tube 5 close to the second end wall 12. Reference numeral 2 shown in FIG. 1 displays a dust inlet communicated with the air outlet tube 5.

Figure 6:
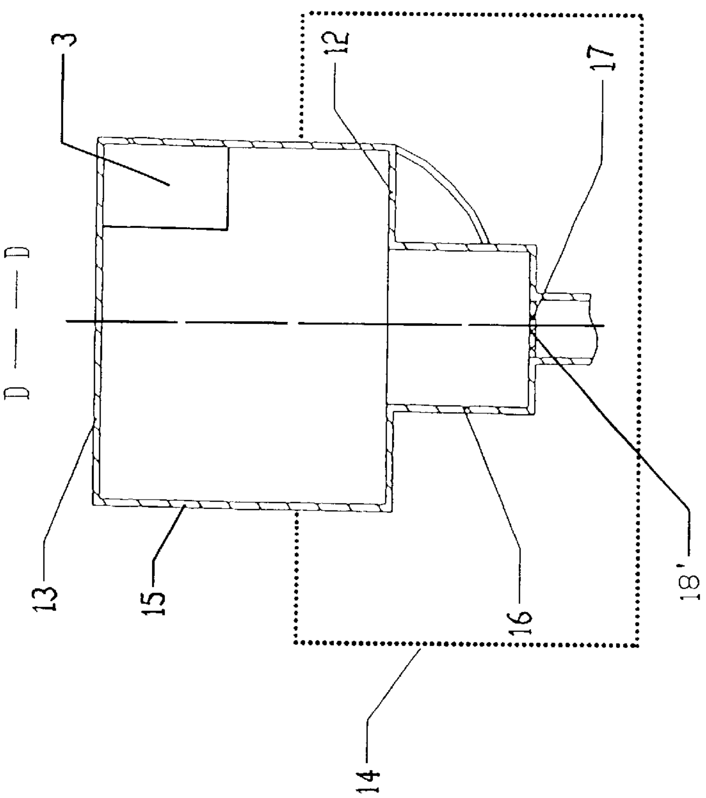
FIG. 6 is a sectional view taken on D—D in FIG. 5.
Figure 5:
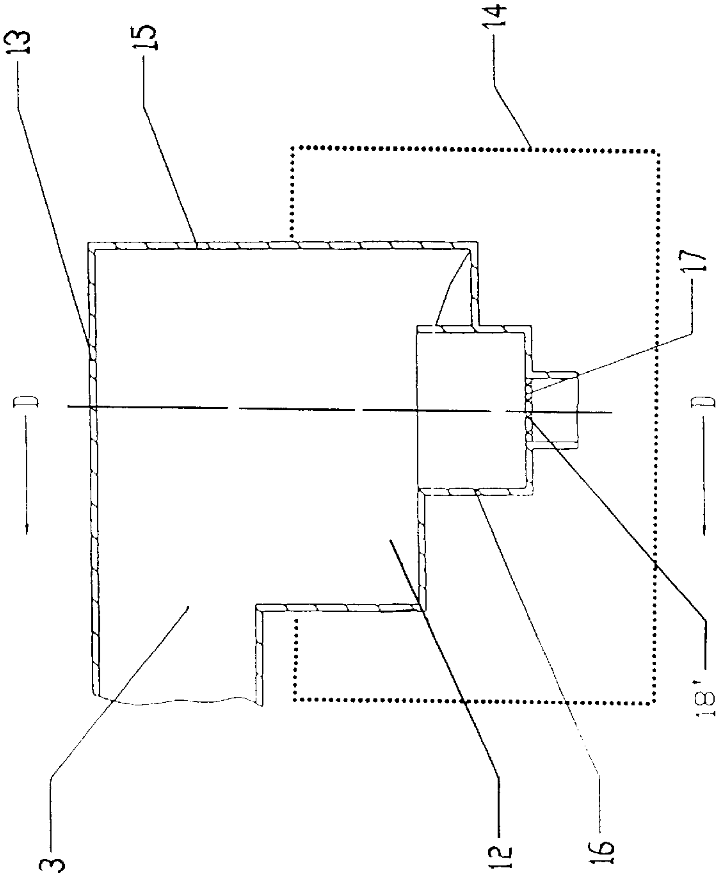
FIG. 5 is an elevation view of the cyclone separator according to a second embodiment of the present invention.

FIGS. 5 and 6 show a part of the second embodiment according to the invention, which omit the air outlet tube 5. In this embodiment, the vacuum suction opening 18' is at the center of the third end wall 7, and covered with a filtering mesh 17. Other elements of the second embodiment are the same as those in the first embodiment.

Although the present invention has been described and exemplified in terms of certain preferred embodiments, other embodiments will be apparent to those skilled in the art. The invention is, therefore, not limited to the particular embodiments described and exemplified, but is capable of modification or variation without departing from the spirit of the invention, the full scope of which is delineated by the appended claims.

I claim:

1. A cyclone separator device for a vacuum cleaner, said cyclone separator comprising:

a first end wall (13), a second end wall (12) opposite to said first end wall (13), an intermediate part (6) between said first end wall (13) and said second end wall (12), being shaped as either a cylinder or a partial truncated cone, wherein said cyclone separator further includes an air suction inlet (3) close to said first end wall (13) and substantially tangential to the inner surface of the intermediate part (6), and a vacuum suction opening (18, 18') distanced from the first end wall (13) connected to a vacuum source route (4);

wherein an opening (19) for a dust outlet channel (1) is provided on the second end wall in such a manner that a dust separated from the dust outlet moves in a direction which forms an angle of α with an axis R of rotation of a vortex created by the cyclone separator comprising the first end wall (13) and the second end wall (12), and enters a dust collecting chamber (8) through the dust outlet channel (1) connected to the dust collecting chamber (8); and wherein said angle α is about 60–89°.

2. The device of claim 1, wherein the angle α is about 75–85°.

3. The device of claim 1, wherein said dust outlet channel (1) is shaped as a spiral.

4. The device of claim 1, wherein said axis R is horizontal and said dust collecting chamber (8) is located at the outside of the cyclone separator.

5. The device of claim 1, wherein said dust collecting chamber (8) includes a dust collecting container (14) connected to the cyclone separator through a sealing ring fixed by a locking mechanism, wherein the dust collecting container (14) may be separated from the dust collecting chamber while the locking mechanism is unlocked.

6. The device of claim 1, wherein said intermediate part (6) includes a first side wall (15) having a larger inner diameter connected to the first end wall (13), and a second side wall (16) having a smaller inner diameter connected to a third end wall (7), wherein the second end wall (12) is located between the first side wall (15) and the second side wall (16), and is connected to the first and second side walls (15) and (16), respectively.

7. The device of claim 6, wherein the vacuum suction opening is positioned at the center of the third end wall (7) and covered by a filtering mesh (17).

* * * * *

UNITED STATES PATENT AND TRADEMARK OFFICE
CERTIFICATE OF CORRECTION

PATENT NO. : 6,596,045 B2
DATED : July 22, 2003
INVENTOR(S) : D. Qian

It is certified that error appears in the above-identified patent and that said Letters Patent is hereby corrected as shown below:

Title page,
Item [73], Assignee, "(CH)" should read -- (CN) --

Signed and Sealed this

Twentieth Day of January, 2004

JON W. DUDAS
*Acting Director of the United States Patent and Trademark Office*